US011442704B2

(12) United States Patent
Kane

(10) Patent No.: US 11,442,704 B2
(45) Date of Patent: Sep. 13, 2022

(54) COMPUTERIZED SYSTEM AND METHOD FOR A DISTRIBUTED LOW-CODE / NO-CODE COMPUTING ENVIRONMENT

(71) Applicant: AVEVA Software, LLC, Lake Forest, CA (US)

(72) Inventor: Douglas Paul Kane, Vashon, WA (US)

(73) Assignee: AVEVA SOFTWARE, LLC, Lake Forest, CA (US)

(*) Notice: Subject to any disclaimer, the term of this patent is extended or adjusted under 35 U.S.C. 154(b) by 0 days.

(21) Appl. No.: 17/095,187

(22) Filed: Nov. 11, 2020

(65) Prior Publication Data

US 2021/0141616 A1  May 13, 2021

Related U.S. Application Data

(60) Provisional application No. 62/933,831, filed on Nov. 11, 2019.

(51) Int. Cl.
*G06F 9/44* (2018.01)
*G06F 8/34* (2018.01)
(Continued)

(52) U.S. Cl.
CPC .............. *G06F 8/34* (2013.01); *G06F 8/33* (2013.01); *G06F 8/35* (2013.01); *G06F 8/77* (2013.01)

(58) Field of Classification Search
CPC ....................................................... G06F 8/34
(Continued)

(56) References Cited

U.S. PATENT DOCUMENTS 8,719,776 B2 * 5/2014 Eteminan ................. G06F 8/20
717/113
8,898,629 B2 * 11/2014 Hirsch ...................... G06F 8/71
717/107

(Continued)

FOREIGN PATENT DOCUMENTS

WO    2019104447 A1    6/2019

OTHER PUBLICATIONS

Chang Young Hyun; "Design and Implementation of a Low-Code/No Code System"; International Journal of Advanced Smart Convergence vol. 8 No. 4 188-193 (2019)—Professor, Dept, of Smart IT, Baewha Women's University, Korea.*

(Continued)

*Primary Examiner* — Francisco J Aponte
(74) *Attorney, Agent, or Firm* — Greenberg Traurig, LLP

(57) ABSTRACT

Disclosed are systems and methods for improving interactions with and between computers in content generating, hosting and/or providing systems supported by or configured with devices, servers and/or platforms. The disclosed systems and methods provide a novel low-code/no-code software development framework that enables the creation of software (e.g., applications) through graphical user interfaces and configurations instead of traditional hand-coded programming. A low code (LC) model enables developers of varied experience levels to create applications using a visual user interface in combination with model-driven logic. Similarly, a no-code model enables the development of applications without and coding on the client-side. The disclosed LCNC framework, therefore, reduces the amount of traditional hand coding, enables accelerated delivery of business applications.

19 Claims, 15 Drawing Sheets

(51) Int. Cl.
*G06F 8/77* (2018.01)
*G06F 8/33* (2018.01)
*G06F 8/35* (2018.01)

(58) Field of Classification Search
USPC .......................................................... 717/109
See application file for complete search history.

(56) References Cited

U.S. PATENT DOCUMENTS

| | | | |
|---|---|---|---|
| 9,064,240 B2* | 6/2015 | March | G06Q 10/103 |
| 9,588,740 B1 | 3/2017 | Tyree et al. | |
| 9,921,822 B2* | 3/2018 | Torok | G06F 16/245 |
| 10,397,345 B2* | 8/2019 | Hwu | H04L 67/18 |
| 10,423,392 B2* | 9/2019 | Rabins | H04W 56/0015 |
| 10,452,360 B1* | 10/2019 | Burman | G06F 9/541 |
| 10,466,863 B1* | 11/2019 | Guy | G06F 3/04845 |
| 10,831,981 B2* | 11/2020 | Rajwat | G06F 40/186 |
| 10,896,035 B1* | 1/2021 | Abdulhayoglu | G06F 8/60 |
| 2014/0258968 A1* | 9/2014 | Brown | G06F 40/166 |
| | | | 717/103 |
| 2015/0142740 A1* | 5/2015 | Behuria | G06F 40/18 |
| | | | 707/634 |
| 2016/0037843 A1 | 2/2016 | Cook | |
| 2016/0104104 A1* | 4/2016 | Ozkan | G06Q 10/087 |
| | | | 705/28 |
| 2016/0132551 A1 | 5/2016 | Trinon et al. | |
| 2016/0173541 A1* | 6/2016 | Gusain | H04L 65/403 |
| | | | 715/212 |
| 2016/0274875 A1* | 9/2016 | Farooqi | G06F 8/34 |
| 2016/0328139 A1 | 11/2016 | Bear et al. | |
| 2017/0075659 A1* | 3/2017 | Warren | G06F 8/31 |
| 2017/0098008 A1* | 4/2017 | Kemmer | G06F 16/258 |
| 2017/0131978 A1* | 5/2017 | Iyer | G06F 3/0486 |
| 2017/0147324 A1* | 5/2017 | Weber | G06F 8/41 |
| 2017/0357424 A1* | 12/2017 | Hess | G06F 9/451 |
| 2018/0157467 A1* | 6/2018 | Stachura | G06F 8/30 |
| 2018/0157468 A1* | 6/2018 | Stachura | G06F 40/186 |
| 2019/0012047 A1* | 1/2019 | Rodgers | G06F 40/103 |
| 2019/0187962 A1* | 6/2019 | Stachura | G06F 40/18 |
| 2019/0392043 A1* | 12/2019 | Wilson | G06F 16/252 |
| 2020/0092178 A1* | 3/2020 | Nelson | H04L 41/145 |
| 2020/0125336 A1* | 4/2020 | Mills | G06F 8/43 |

OTHER PUBLICATIONS

Tina Beranič et al. "Adoption and Usability of Low-Code/No Code Development Tools"; Faculty of Electrical Engineering and Computer Science, University of Maribor Koroška cesta 46, Maribor, Slovenia—31st CECIIS, Oct. 7-9, 2020.*
International Search Report and Written Opinion for corresponding International Application No. PCT/US2021/060006 dated Mar. 2, 2021, 9 pages.

* cited by examiner

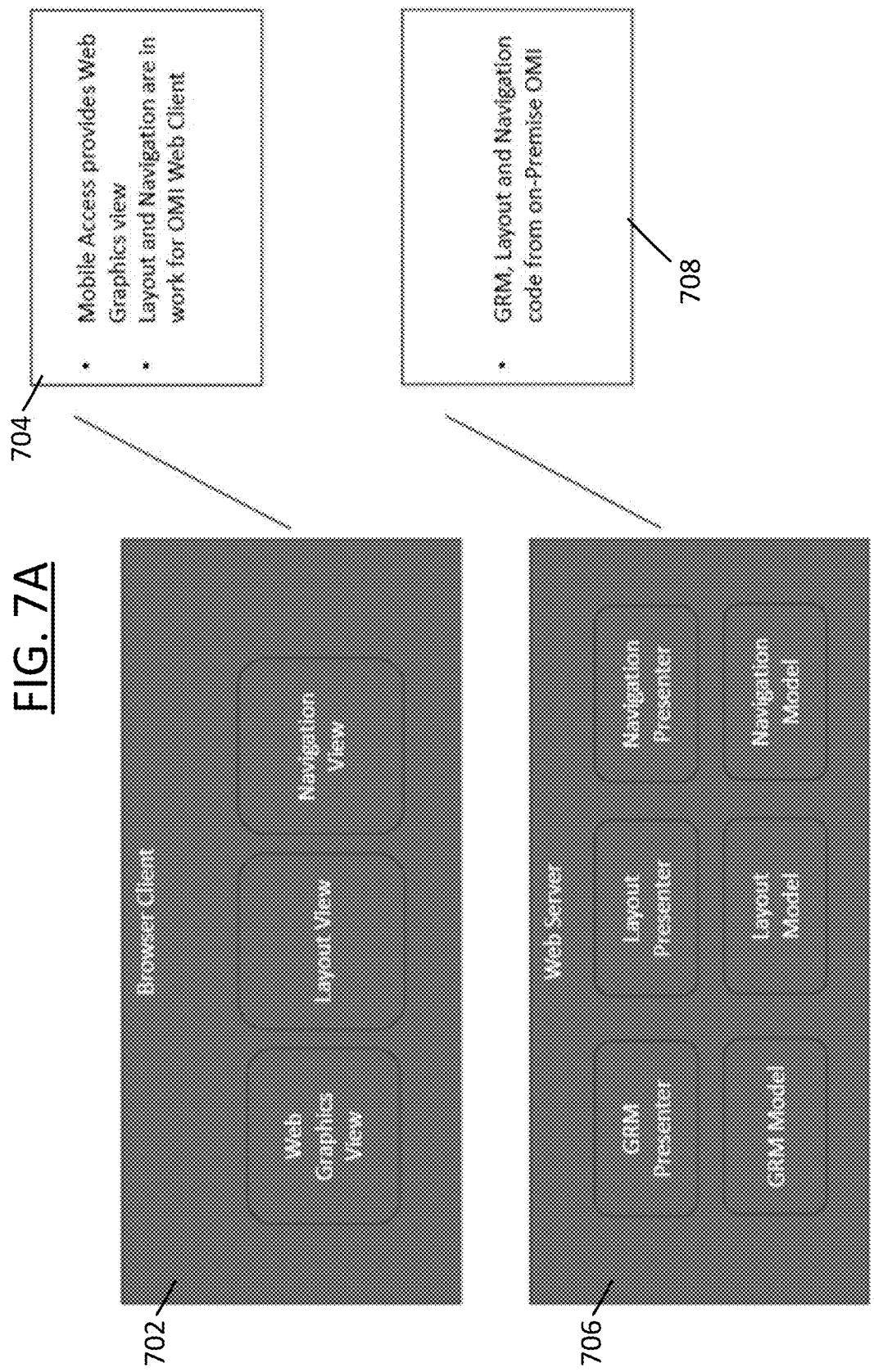

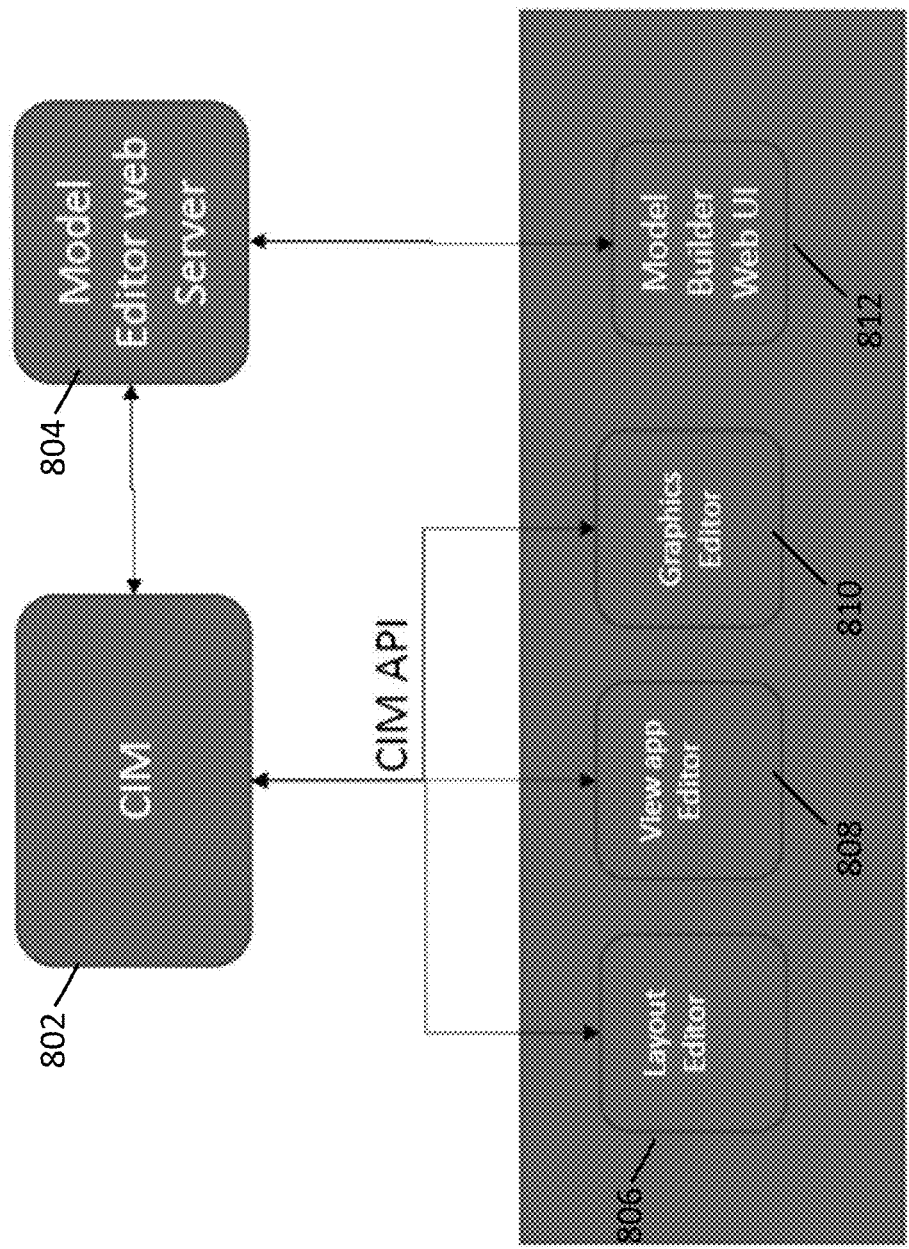

COMPUTERIZED SYSTEM AND METHOD FOR A DISTRIBUTED LOW-CODE / NO-CODE COMPUTING ENVIRONMENT

CROSS-REFERENCE TO RELATED APPLICATIONS

This application claims the benefit of priority from U.S. Provisional Application No. 62/933,831, filed Nov. 11, 2019, entitled "Low-Code/No-Code System and Server," which is incorporated herein by reference in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

Some embodiments relate generally to improving the performance of network-based computerized content generating, hosting and providing devices, systems and/or platforms by modifying the capabilities and providing non-native functionality to such devices, systems and/or platforms through a novel and improved framework for enabling the creation of off-site and/or remote development of software applications.

BACKGROUND

Currently, in order for software to be executed and developed off-site, or at remote locations distinct from a central server location, a developer must re-create the software development kit (SDK) and/or application program interface (API) development environment and construct the application from scratch. In some situations, app-tools can be retrieved from a web-based resource; however, even then, the developer is confined to the tools he/she is provided, and the development environment must still be recreated, which in most situations, requires coding and/or developing the application in a neutral, resource deficient environment.

SUMMARY

The disclosed systems and methods provides novel mechanism for creating a low-code/no-code distributed application development environment. Low-code software coding is a way to design and develop software applications quickly and with minimal hand coding. Low-code techniques enable users to deliver value more quickly and more reliably. Using visual modeling in a graphical interface to assemble and configure applications, developers are provided the ability to skip all the infrastructure and re-implementation of patterns that can bog them down and go straight to the unique features of an application.

Some embodiments can comprise an environment where users, without special software engineering and/or programming skills, can create industrial applications to monitor, manage, control, maintain and optimize their industrial facilities, processes and production. In some embodiments, domain users can create applications each user needs. In some embodiments, applications can be applicable to on-premise as well as cloud and edge based applications. In some embodiments, users can build applications and run the applications where they make the most sense.

Some embodiments enable application building using visual programing, drag and drop and forms-based configuration. In some embodiments, configuration can be based on a common model (e.g., Common Intelligent Model (CIM)). In some embodiments, the common model entities can be the basis of automatic navigation, contain multiple facets (behaviors) which describe the entities and form a knowledge graph of what is known and actionable, and visible about each entity. In some embodiments, entities can comprise equipment, materials, and/or products.

In some embodiments, the Low-Code/No-Code (LCNC) framework discussed herein can be implemented via personas. In some embodiments, the LCNC framework comprises layouts, model driven navigation, and applications. In some embodiments, the LCNC framework comprises architecture, configuration, and application building. In some embodiments, the LCNC framework comprises decoupling an operator-machine interface (OMI)—e.g., external models, Idata, and the like. Some embodiments comprise automation technology, such as, for example, NXT Control, OASys, and the like. In some embodiments, the LCNC framework comprises CIM model, software development kits (SDKs), Apps, and the like.

In some embodiments, the LCNC framework comprises large infrastructure of next generation supervisory control and data acquisition (SCADA) systems. Some embodiments comprise timeline storyboards, content types, tagging, and model based navigation. Some embodiments include several parts for re-use.

In some embodiments, the LCNC framework can allow a user to create an end user focused application without writing code. In some embodiments, a user need not possess hypertext markup language (HTML), JavaScript®, Quickscript™ skills, or other software engineering or programming skills. In some embodiments, there can be a continuum from low-code to no-code. In some embodiments, a persona can have a low-code environment to build template applications that can enable users to have a no-code capability to build final end user applications.

In some embodiments, the LCNC framework can comprise a non-developer persona, such as a citizen developer, and visual application building. In some embodiments, the LCNC framework can comprise a development platform that can be a visually integrated development environment that allows citizen developers to drag-and-drop application components, connect them together, and create an application.

In some embodiments, a low-code development platform ("LCDP") can be a software that can provide environment programmers use to create application software through graphical user interfaces and configuration instead of traditional computer programming.

In some embodiments, personas can comprise an original equipment manufacturer (OEM) application template builder (SE and other) for machine monitoring, an OEM application builder/customizer, and an OEM application user (for machine monitoring). In some embodiments, SCADA customers with multiple machines running as a system can comprise an application for monitoring and control functions. In some embodiments, the machines can be utilized from an OEM application.

In some embodiments, a citizen developer can be a user who can create new business applications. In some embodiments, new business applications can be created for consumption by other users using development and runtime environments sanctioned by corporate IT. In some embodiments, a citizen developer can use tools to their advantage to find solutions. In some embodiments, many citizen developers are digital natives who grew up with and understand the value of software. In some embodiments, citizen developers can be open to learning and implementing new tools that can increase productivity and assist their workflow.

In some embodiments, a persona can comprise a citizen engineer. In some embodiments, a citizen engineer can build template applications and can write code. Some embodiments include a cloud platform user, such as, for example, but not limited to, a user of AVEVA Insight® software. Reference herein will be to example cloud platform Insight®; however, it should not be construed as limiting, as any type of cloud platform, whether known or to be known, can be leveraged in a LCNC computing environment, as discussed herein.

In some embodiments, the cloud user can be a self-service application creator that uses templates. In some embodiments, the cloud user can require and/or expect no-code capability. Some embodiments comprise a data analyst (self-service content builder). Some embodiments can require an asset model and pre-built models to enable the data analyst's input.

In some embodiments, the LCNC framework can create end user applications from any type of proprietary, third party, user generated or network based content. In some embodiments, the applications can be created using any type of code, whether known or to be known, and based on any type of known or to be known platform. In some embodiments, applications can be generated via minimal and/or no-coding, as discussed herein, as provided by the LCNC framework. Some embodiments include a continuum from Low-Code to No-Code that can target different personas.

Some embodiments create OMI Apps (e.g., widgets) without writing code or at least minimal (without using Visual Studio), such as, for example, node red, Betty Blocks, and the like. Some embodiments integrate OMI Apps/Widgets without writing code/script. Some embodiments comprise OMI on-premise and in the cloud functionality.

Thus, according to some embodiments, the disclosed LCNC framework provides a distributed software development environment that enables the creation of software (e.g., applications) through graphical user interfaces and configurations instead of traditional hand-coded programming. A low code (LC) model enables developers of varied experience levels to create applications using a visual user interface in combination with model-driven logic. Similarly, a no-code model enables the development of applications without and coding on the client-side. The disclosed LCNC framework, therefore, reduces the amount of traditional hand coding, enables accelerated delivery of business applications. The LCNC framework also lowers the initial cost of setup, training, deployment and maintenance of applications and services.

According to some embodiments, a computer-implemented method is disclosed which provides cloud-based functionality for enabling the creation of off-site and/or remote development of software applications.

Some embodiments provide a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, messaging server, email server, ad server, content server and/or client device, and the like) cause at least one processor to perform a method for a novel and improved framework which provides cloud-based functionality for enabling the creation of off-site and/or remote development of software applications.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

According to some embodiments, a computing device is disclosed which comprises: one or more processors; and a non-transitory computer-readable memory having stored therein computer-executable instructions, that when executed by the one or more processors, cause the one or more processors to perform actions comprising: receiving a request to generate an application, the request comprising information indicating specific functionality of a physical asset at a location; identifying application rules associated with the physical asset and application rules associated with the specific functionality; compiling and presenting a user interface (UI) based on the identified application rules, the UI comprising interface objects (IOs) corresponding to capabilities for generating components of the requested application; receiving interactions with the IOs, the interactions comprising feedback indicating a configuration of the capabilities; generating, based on the received interactions, the requested application, the generated application being configured according to the configured capabilities identified from the interactions; and enabling, via the computing device, execution of the generated application.

In some embodiments, the actions further comprise: storing information related to the generated application in cloud storage. In some embodiments, the actions further comprise: receiving another request related to another physical asset, the other physical asset being a type of asset that is similar to the physical asset at the location; retrieving the stored information for the generated application; and compiling and presenting another UI based on the information. In some embodiments, the other physical asset is at another location, wherein the other UI is compiled further based on information related to the other location.

In some embodiments, the request further comprises information indicating a low code (LC) or (NC) environment, wherein the UI is configured according to the LC or NC information.

In some embodiments, the feedback comprises an action selected from a group consisting of: modification of a layout, editing of a tool, editing of a size, editing of a format, editing of a function, addition of a function and removal of a function.

In some embodiments, the specific functionality for the requested application corresponds to at least one of a type of operation performed by the physical asset, a type of input/output data and type of computations performed by the physical asset.

In some embodiments, the applications rules for the physical asset and specific functionality are retrieved from a cloud storage on a network.

In some embodiments, the physical asset application rules correspond to capabilities of the physical asset and a type of data associated with operation of the physical asset.

In some embodiments, the application rules for the specific functionality correspond to operations of the physical asset and capabilities for performing the operations.

In some embodiments, the request is received from a device executing at the location.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIGS. 7A-7B illustrate a viewApp run time architecture according to some embodiments of the present disclosure;

FIGS. 8A-8B illustrate a configuration architecture according to some embodiments of the present disclosure;

DESCRIPTION OF EMBODIMENTS

Figure 1:
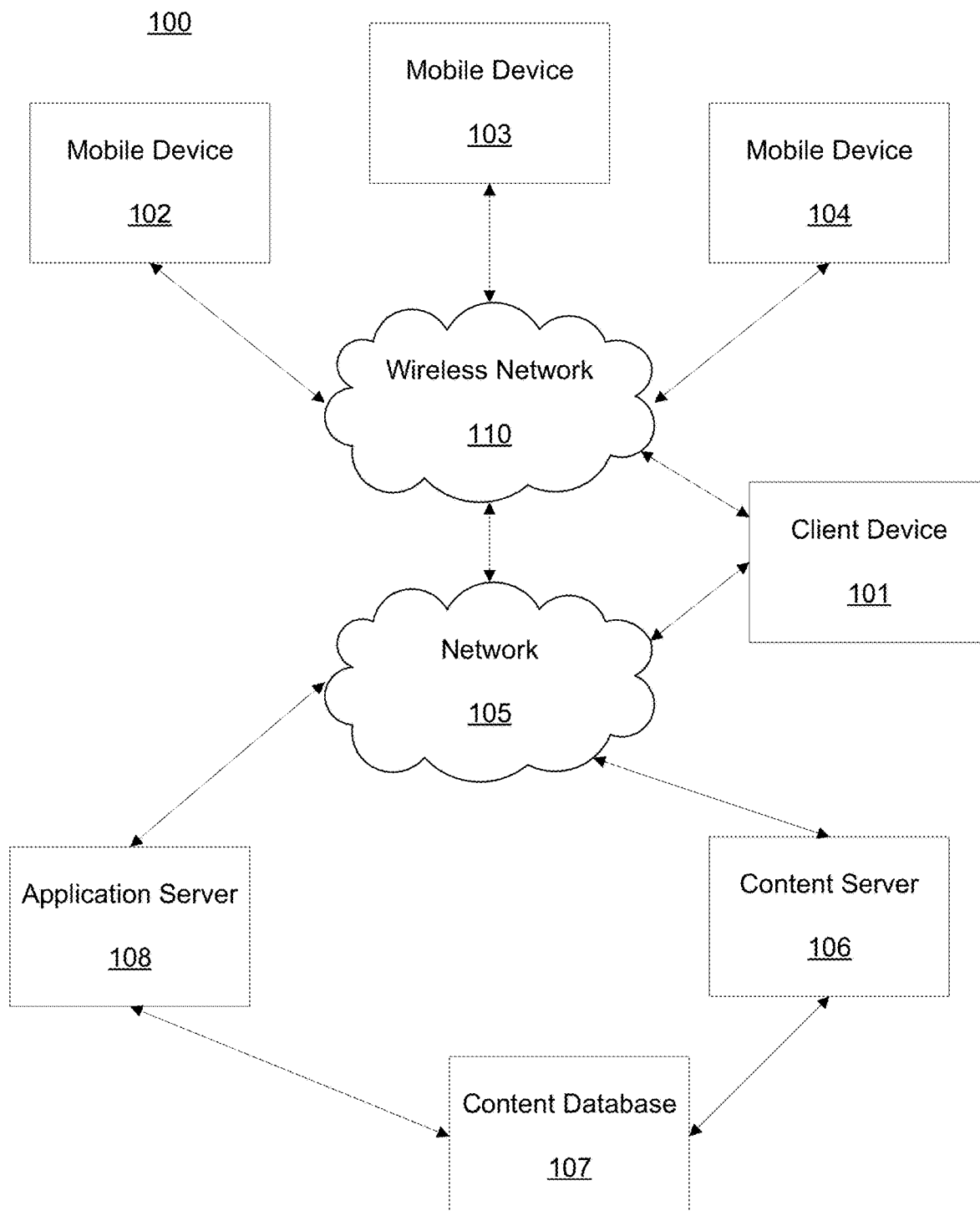
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments will now be described in greater detail with reference to the figures. In general, with reference to FIG. 1, a system 100 in accordance with some embodiments of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")-network 105, wireless network 110, mobile devices (client devices) 102-104 and client device 101. FIG. 1 additionally includes a variety of servers, such as content server 106 and application (or "App") server 108.

Some embodiments of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above.

Mobile devices 102-104 also may include at least one client application that is configured to receive content from another computing device. In some embodiments, mobile devices 102-104 may also communicate with non-mobile client devices, such as client device 101, or the like. In some embodiments, such communications may include sending and/or receiving messages, creating and uploading documents, searching for, viewing and/or sharing memes, photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

In some embodiments, wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

In some embodiments, network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

In some embodiments, the content server 106 may include a device that includes a configuration to provide any type or form of content via a network to another device. Devices that may operate as content server 106 include personal computers, desktop computers, multiprocessor systems, microprocessor-based or programmable consumer electronics, network PCs, servers, and the like. In some embodiments, content server 106 can further provide a variety of services that include, but are not limited to, email services, instant messaging (IM) services, streaming and/or downloading media services, search services, photo services, web services, social networking services, news services, third-party services, audio services, video services, SMS services, MMS services, FTP services, voice over IP (VOIP) services, or the like. Such services, for example the email services and email platform, can be provided via the message server 120.

In some embodiments, users are able to access services provided by servers 106 and 108. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, application server 108, for example, can store various types of applications and application related information including application data and user profile information (e.g., identifying, generated and/or observed information associated with a user).

In some embodiments, content server 106 and app server 108 can store various types of data related to the content and services each provide, observe, identify, determine, generate, modify, retrieve and/or collect. Such data can be stored in an associated content database 107, as discussed in more detail below.

In some embodiments, server 106 and/or 108 can be embodied as a cloud server or configured for hosting cloud services, as discussed herein.

In some embodiments, the network 105 is also coupled with/connected to a Trusted Search Server (TSS) which can be utilized to render content in accordance with the embodiments discussed herein. Embodiments exist where the TSS functionality can be embodied within servers 106 and 108.

Moreover, although FIG. 1 illustrates servers 106 and 108 as single computing devices, respectively, the disclosure is not so limited. For example, one or more functions of servers 106 and 108 may be distributed across one or more distinct computing devices. Moreover, in some embodiments, servers 106 and 108 may be integrated into a single computing device, without departing from the scope of the present disclosure.

Additionally, while the illustrated embodiment in FIG. 1 depicts only servers 106 and 108, it should not be construed as limiting, as any type and number of servers can be included therein.

Figure 2:
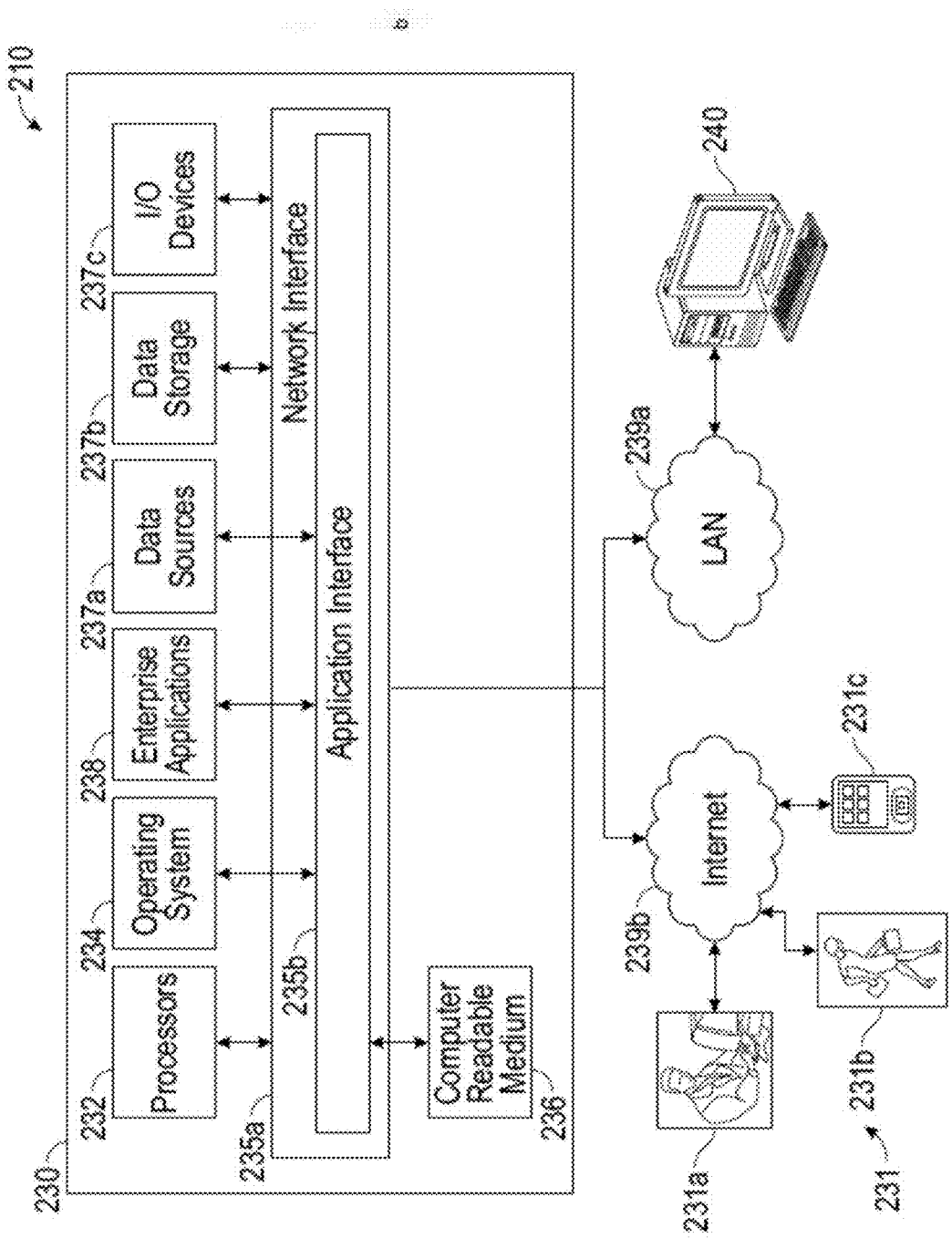
FIG. 2 is a schematic diagram illustrating an example of a network within which the systems and methods disclosed herein could be implemented according to some embodiments of the present disclosure.

Turning to FIG. 2, computer system 210 is depicted and is a non-limiting example embodiment of system 100 discussed above in relation to FIG. 1.

FIG. 2 illustrates a computer system 210 enabling or operating an embodiment of system 100 of FIG. 1, as discussed below. In some embodiments, computer system 210 can include and/or operate and/or process computer-executable code of one or more of the above-mentioned program logic, software modules, and/or systems. Further, in some embodiments, the computer system 210 can operate and/or display information within one or more graphical user interfaces. In some embodiments, the computer system 210 can comprise a cloud server and/or can be coupled to one or more cloud-based server systems.

In some embodiments, the system 210 can comprise at least one computing device 230 including at least one processor 232. In some embodiments, the at least one processor 232 can include a processor residing in, or coupled to, one or more server platforms. In some embodiments, the system 210 can include a network interface 235a and an application interface 235b coupled to the least one processor 232 capable of processing at least one operating system 234. Further, in some embodiments, the interfaces 235a, 235b coupled to at least one processor 232 can be configured to process one or more of the software modules 238 (e.g., such as enterprise applications). In some embodiments, the software modules 238 can include server-based software, and can operate to host at least one user account and/or at least one client account, and operating to transfer data between one or more of these accounts using the at least one processor 232.

With the above embodiments in mind, it should be understood that some embodiments can employ various computer-implemented operations involving data stored in computer systems. Moreover, the above-described databases and models described throughout can store analytical models and other data on computer-readable storage media within the system 210 and on computer-readable storage media coupled to the system 210. In addition, the above-described applications of the system can be stored on non-transitory computer-readable storage media within the system 210 and on computer-readable storage media coupled to the system 210.

In some embodiments, the system 210 can comprise at least one non-transitory computer readable medium 236 coupled to at least one data source 237a, and/or at least one data storage device 237b, and/or at least one input/output device 237c. In some embodiments, the disclosed systems and methods can be embodied as computer readable code on a computer readable medium 236. In some embodiments, the computer readable medium 236 can be any data storage device that can store data, which can thereafter be read by a computer system (such as the system 210). In some embodiments, the computer readable medium 236 can be any physical or material medium that can be used to tangibly store the desired information or data or instructions and which can be accessed by a computer or processor 232. In some embodiments, at least one of the software modules 238 can be configured within the system to output data to at least one user 231 via at least one graphical user interface rendered on at least one digital display.

In some embodiments, the non-transitory computer readable medium 236 can be distributed over a conventional computer network via the network interface 235a where the system embodied by the computer readable code can be stored and executed in a distributed fashion. For example, in some embodiments, one or more components of the system 210 can be coupled to send and/or receive data through a local area network ("LAN") 239a and/or an internet coupled network 239b (e.g., such as a wireless internet). In some further embodiments, the networks 239a, 239b can include wide area networks ("WAN"), direct connections (e.g., through a universal serial bus port), or other forms of computer-readable media 236, or any combination thereof.

In some embodiments, components of the networks 239a, 239b can include any number of user devices such as personal computers including for example desktop computers, and/or laptop computers, or any fixed, generally non-mobile internet appliances coupled through the LAN 239a. For example, some embodiments include personal computers 240a coupled through the LAN 239a that can be configured for any type of user including an administrator. Other embodiments can include personal computers coupled through network 239b. In some further embodiments, one or more components of the system 210 can be coupled to send or receive data through an internet network (e.g., such as network 239b). For example, some embodiments include at least one user 231 coupled wirelessly and accessing one or more software modules of the system including at least one enterprise application 238 via an input and output ("I/O") device 237c. In some other embodiments, the system 210 can enable at least one user 231 to be coupled to access enterprise applications 238 via an I/O device 237c through LAN 239a. In some embodiments, the user 231 can comprise a user 231a coupled to the system 210 using a desktop computer, and/or laptop computers, or any fixed, generally non-mobile internet appliances coupled through the internet 239b. In some embodiments, the user 231 can comprise a mobile user 231b coupled to the system 210. In some embodiments, the user 231b can use any mobile computing device 231c to wirelessly coupled to the system 210, including, but not limited to, personal digital assistants, and/or cellular phones, mobile phones, or smart phones, and/or pagers, and/or digital tablets, and/or fixed or mobile internet appliances.

Figure 3:
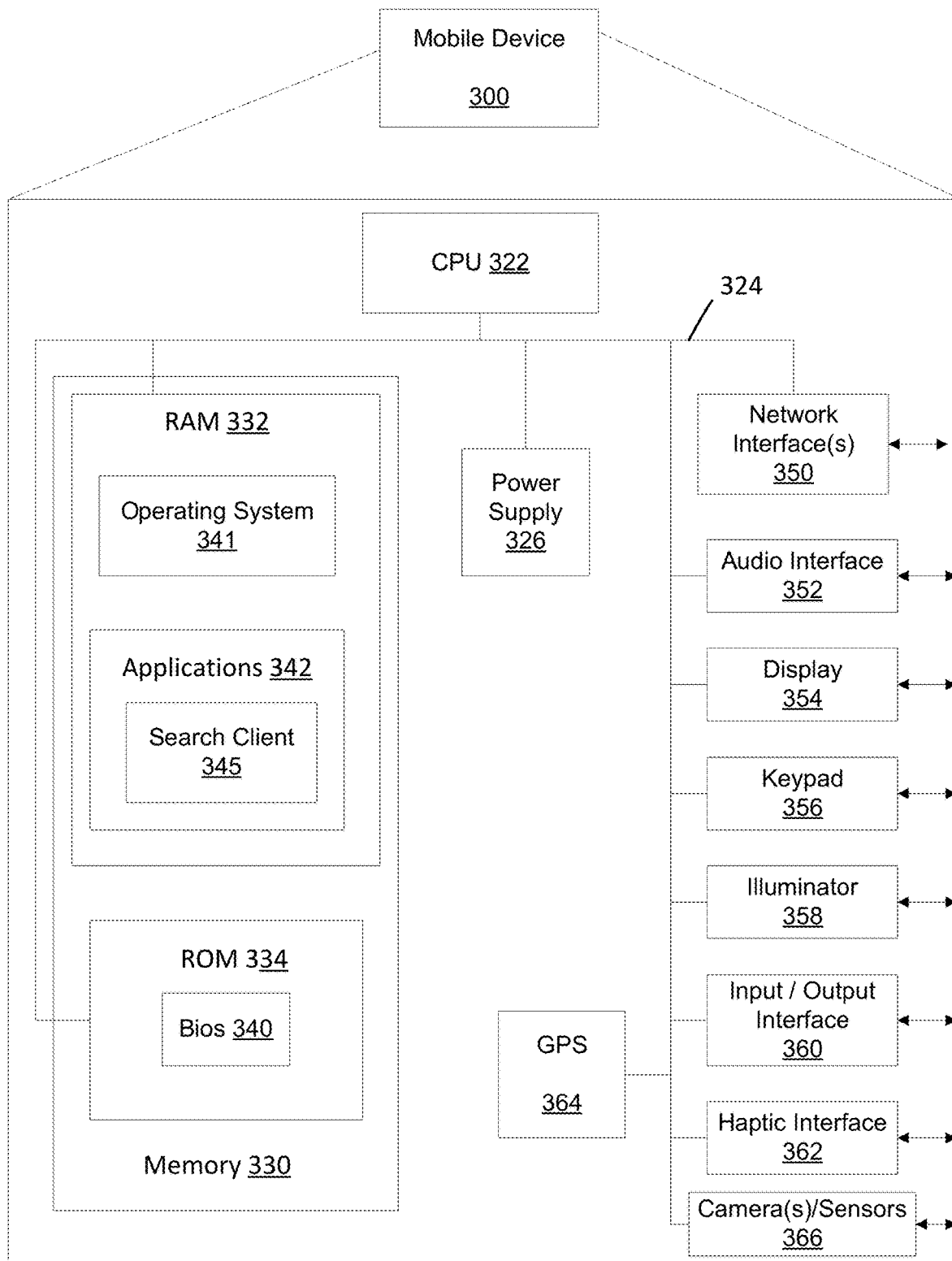
FIG. 3 depicts is a schematic diagram illustrating an example of client device according to some embodiments of the present disclosure.

FIG. 3 is a schematic diagram illustrating a client device showing an example embodiment of a client device that may be used within the present disclosure. Client device 300 may include many more or less components than those shown in FIG. 3. However, the components shown are sufficient to disclose an illustrative embodiment for implementing the present disclosure. Client device 300 may represent, for example, client devices discussed above in relation to FIGS. 1-2.

As shown in FIG. 3, in some embodiments, Client device 300 includes a processing unit (CPU) 322 in communication with a mass memory 330 via a bus 324. In some embodiments, Client device 300 also includes a power supply 326, one or more network interfaces 350, an audio interface 352, a display 354, a keypad 356, an illuminator 358, an input/output interface 360, a haptic interface 362, an optional global positioning systems (GPS) receiver 364 and a camera (s) or other optical, thermal or electromagnetic sensors 366. Device 300 can include one camera/sensor 366, or a plurality of cameras/sensors 366, as understood by those of skill in the art. Power supply 326 provides power to Client device 300.

Client device 300 may optionally communicate with a base station (not shown), or directly with another computing device. Network interface 350 is sometimes known as a transceiver, transceiving device, or network interface card (NIC).

In some embodiments, audio interface 352 is arranged to produce and receive audio signals such as the sound of a human voice. Display 354 may be a liquid crystal display (LCD), gas plasma, light emitting diode (LED), or any other type of display used with a computing device. Display 354 may also include a touch sensitive screen arranged to receive input from an object such as a stylus or a digit from a human hand.

Keypad 356 may comprise any input device arranged to receive input from a user. Illuminator 358 may provide a status indication and/or provide light.

In some embodiments, client device 300 also comprises input/output interface 360 for communicating with external. Input/output interface 360 can utilize one or more communication technologies, such as USB, infrared, Bluetooth™, or the like. In some embodiments, haptic interface 362 is arranged to provide tactile feedback to a user of the client device.

Optional GPS transceiver 364 can determine the physical coordinates of Client device 300 on the surface of the Earth, which typically outputs a location as latitude and longitude values. GPS transceiver 364 can also employ other geo-positioning mechanisms, including, but not limited to, tri-angulation, assisted GPS (AGPS), E-OTD, CI, SAI, ETA, BSS or the like, to further determine the physical location of Client device 300 on the surface of the Earth. In some embodiments, however, Client device may through other components, provide other information that may be employed to determine a physical location of the device, including for example, a MAC address, Internet Protocol (IP) address, or the like.

In some embodiments, mass memory 330 includes a RAM 332, a ROM 334, and other storage means. Mass memory 330 illustrates another example of computer storage media for storage of information such as computer readable instructions, data structures, program modules or other data. Mass memory 330 stores a basic input/output system ("BIOS") 340 for controlling low-level operation of Client device 300. The mass memory also stores an operating system 341 for controlling the operation of Client device 300.

In some embodiments, memory 330 further includes one or more data stores, which can be utilized by Client device 300 to store, among other things, applications 342 and/or other information or data. For example, data stores may be employed to store information that describes various capabilities of Client device 300. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 300.

In some embodiments, applications 342 may include computer executable instructions which, when executed by Client device 300, transmit, receive, and/or otherwise process audio, video, images, and enable telecommunication with a server and/or another user of another client device. In some embodiments, applications 342 may further include search client 345 that is configured to send, to receive, and/or to otherwise process a search query and/or search result.

Having described the components of the general architecture employed within some embodiments, the components' general operation with respect to some embodiments will now be described below.

Figure 4:
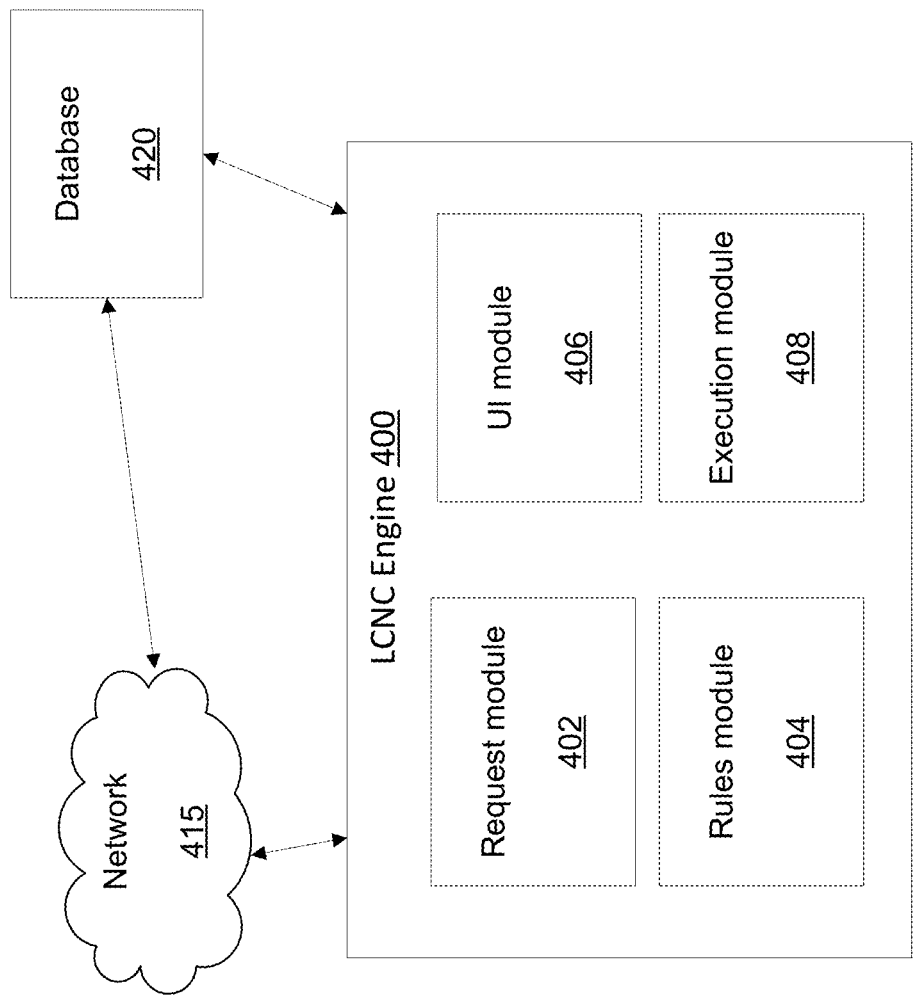
FIG. 4 is a block diagram illustrating components of an exemplary system in accordance with some embodiments of the present disclosure.

FIG. 4 is a block diagram illustrating the components of some embodiments. FIG. 4 includes low-code/no-code (LCNC) engine 400, network 415 and database 420. The LCNC engine 400 can be a special purpose machine or processor and could be hosted by a cloud server (e.g., cloud web services server(s)), messaging server, application server, content server, social networking server, web server, search server, content provider, third party server, user's computing device, and the like, or any combination thereof.

According to some embodiments, LCNC engine 400 can be embodied as a stand-alone application that executes on a server and/or user device (e.g., on a cloud server and/or on-prem on a user device or local storage). In some embodiments, the LCNC engine 400 can function as an application installed on a device; and, in some embodiments, such application can be a web-based application accessed by a device over a network.

The database 420 can be any type of database or memory, and can be associated with a content server on a network (e.g., cloud server, content server, a search server or application server) or a user's device (e.g., client devices discussed above in FIGS. 1-3). Database 420 comprises a dataset of data and metadata associated with local and/or network information related to users, services, applications, content and the like. Such information can be stored and indexed in the database 420 independently and/or as a linked or associated dataset. As discussed above, it should be understood that the data (and metadata) in the database 420 can be any type of information and type, whether known or to be known, without departing from the scope of the present disclosure.

According to some embodiments, database 420 can store data and metadata associated with users, operations, tasks, assets, files, projects, versions, synchronization events, schedules, images, videos, text, messages, products, items and services from an assortment of media and/or service providers and/or platforms, and the like.

According to some embodiments, database 420 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof.

In some embodiments, the user data can also include user device information, including, but not limited to, device identifying information, device capability information, voice/data carrier information, applications installed or capable of being installed or executed on such device, and/or any, or some combination thereof. It should be understood that the data (and metadata) in the database 420 can be any type of information related to a user, asset, location, job, operation, content, a device, an application, a service provider, a content provider, whether known or to be known, without departing from the scope of the present disclosure.

As discussed above, with reference to FIGS. 1-2, the network 415 can be any type of network such as, but not limited to, a wireless network, a local area network (LAN), wide area network (WAN), the Internet, or a combination thereof. The network 415 facilitates connectivity of the LCNC engine 400, and the database of stored resources 420. Indeed, as illustrated in FIG. 4, the LCNC engine 400 and database 420 can be directly connected by any known or to be known method of connecting and/or enabling communication between such devices and resources.

The principal processor, server, or combination of devices that comprises hardware programmed in accordance with the special purpose functions herein is referred to for convenience as LCNC engine 400, and includes request module 402, rules module 404; user interface (UI) module 406 and execution module 408. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Turning to the discussion of FIGS. 5-11, one of skill in the art will recognize that while specific mention of specific types of programs, platforms or applications are utilized, it should not be construed as limiting, as any type of similar program can be utilized without departing from the scope of the instant disclosure.

Figure 5:
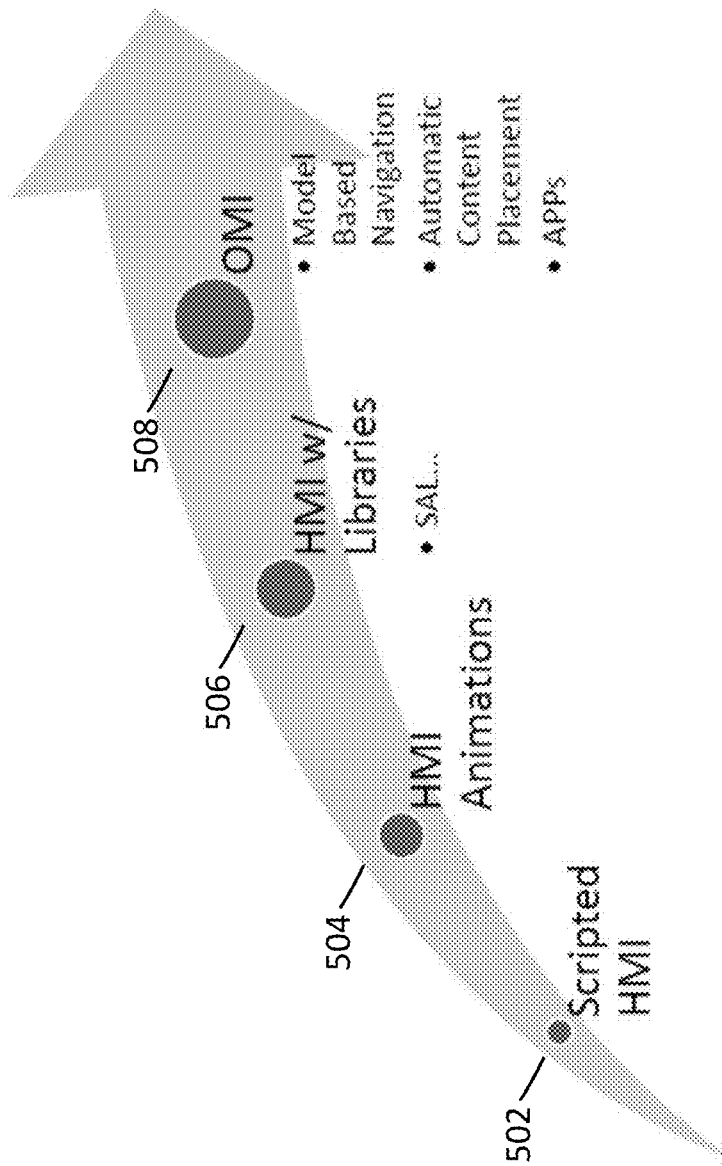
FIG. 5 illustrates an OMI basis according to some embodiments of the present disclosure.

FIG. 5 illustrates an operator machine interface (OMI) basis according to some embodiments. Some embodiments include Scripted human machine interface (HMI) 502, HMI Animations 504, HMI with libraries 506, and OMI 508. In some embodiments, OMI 508 can comprise model-based navigation, automatic content placement, and Apps. In some embodiments, OMI capability in the cloud can include, but are not limited to: asset templates, binding/link graphics and layouts to assets or templates, model building tools, graphic editors, application editors, application concepts, common HTML based Apps, an HTML Apps builder (common applications), an extensive library of graphics/symbols, support, and the like.

In some embodiments, application concept can include, but are not limited to, Viewapp, layouts, model-driven navigation, and context drive apps. In some embodiments, Intouch web teams can provide layouts. In some embodiments, the extensive library of graphics/symbols can comprise tenant specific libraries and support for bringing graphics from on-premise. In some embodiments, support can be references and setting/binding owning objects. Some embodiments include wire up graphics properties.

In some embodiments, the LCNC framework can be designed to enable building HMI applications with minimal coding/scripting. Some embodiments include automatic and code free navigation based on an asset model, layout of content, and a rich app model for extensibility.

In some embodiments, the following can be added to cloud software: application concept, asset modeling, and visualization. In some embodiments, the application concept can comprise the ability to create and run an application. In some embodiments, the application concept can provide default applications for users. In some embodiments, asset modeling can comprise a visual modeling capability and asset templates. In some embodiments, visualization can comprise a model-driven navigation and layouts.

In some embodiments, the following can be added to OMI and Cloud software: common HTTP Apps, visual programming, forms App, and App builder (low code). In some embodiments, self-service graphics workflow can be added to OMI.

Figure 6B:
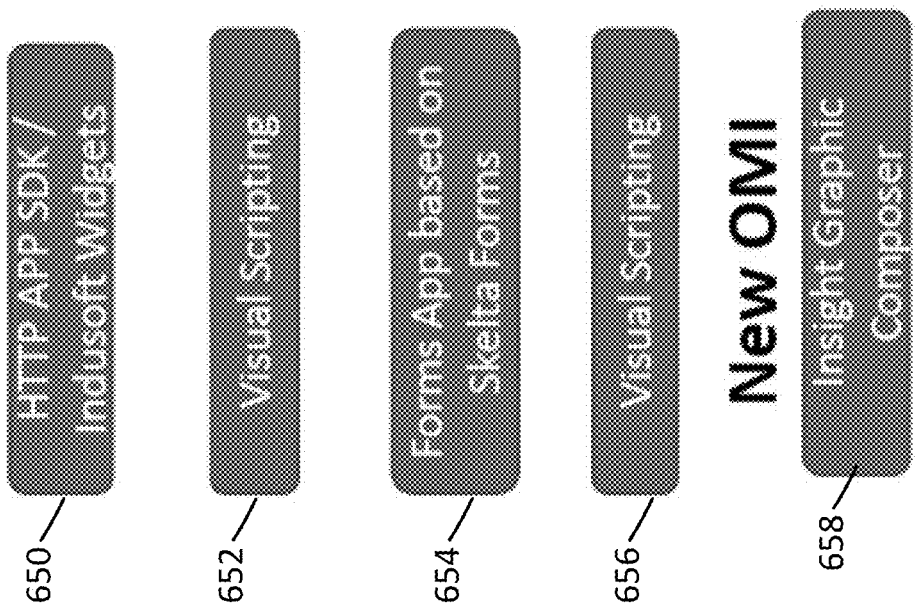
FIGS. 6A-6B illustrate cloud software capabilities of some embodiments according to the present disclosure.
Figure 6A:
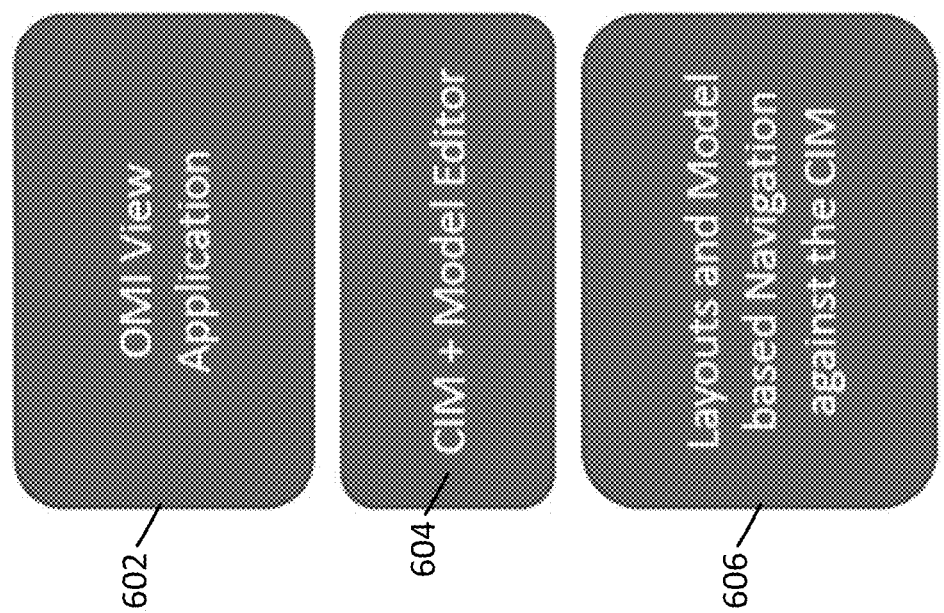

FIG. 6A-6B illustrate provided Cloud software capabilities according to some embodiments. In some embodiments, as illustrated in FIG. 6A, the application concept can comprise an OMI view application 602. In some embodiments, asset modeling can comprise a CIM+model editor 604. In some embodiments, visualization can comprise layouts and model based navigation against the CIM 606.

In some embodiments, as illustrated in FIG. 6B, common HTTP Apps can comprise HTTP APP SDK/Indusoft widgets 650. In some embodiments, visual programming can comprise visual scripting 652. In some embodiments, forms App can comprise forms App based on Skelta forms 654. In some embodiments, the App builder (low-code) can comprise visual scripting 656. In some embodiments, self-service graphics workflow can comprise a cloud graphic composer 658, such as, for example, the Insight® graphic composer.

Figure 7B:
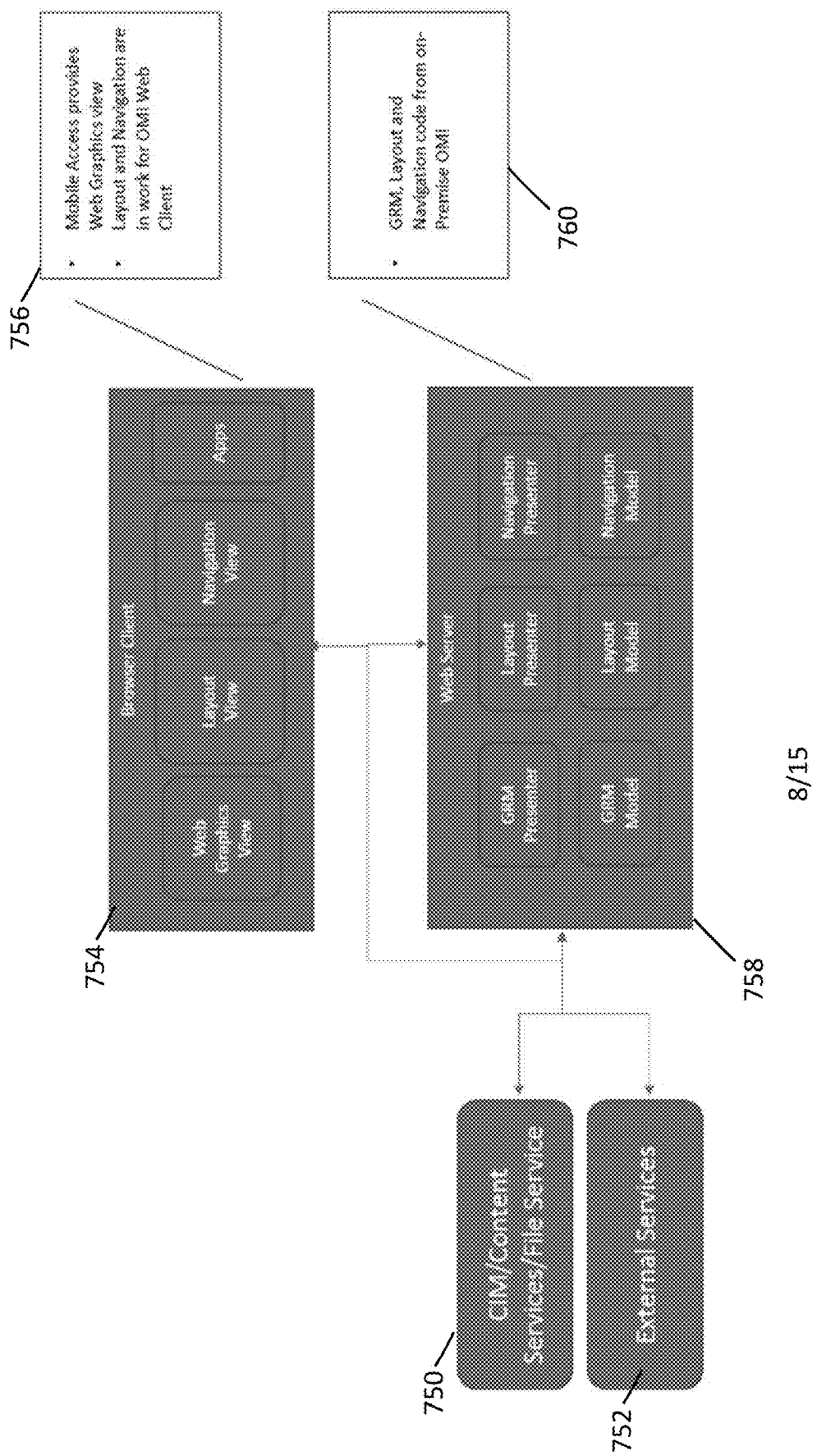

FIGS. 7A-7B illustrate a viewApp run time architecture according to some embodiments. Some embodiments include a browser client 702 and web server 706. In some embodiments, a CIM/content services/file service and an external service can be coupled to the client 702 and/or server 706. In some embodiments, a browser client 702 can comprise web graphics view, layout view navigation view, and Apps. In some embodiments, the client 702 can have functionality 704: mobile access can provide a web graphics view; and/or layout and navigation can work for OMI web clients.

In some embodiments, a web server 706 can comprise a software component to present graphics using a graphics runtime module (GRM). In some embodiments, a web server 706 can include: a GRM presenter, a layout presenter, a navigation presenter, a GRM model, a layout model, and navigation model. In some embodiments server 706 can include functionality 708: GRM, layout, and navigation code can be provided from on-premise OMI.

In some embodiments, on premise components of server 706's functionality 706 can use a minimum viable product (MVP). Some embodiments include re-using model code from a premise OMI functionality. In some embodiments, for example, the same architecture approach as InSight® process visualization (graphics) and Intouch® web client can be used. Some embodiments can be hosted as containerized web service using service fabric/AKS.

Figure 8B:
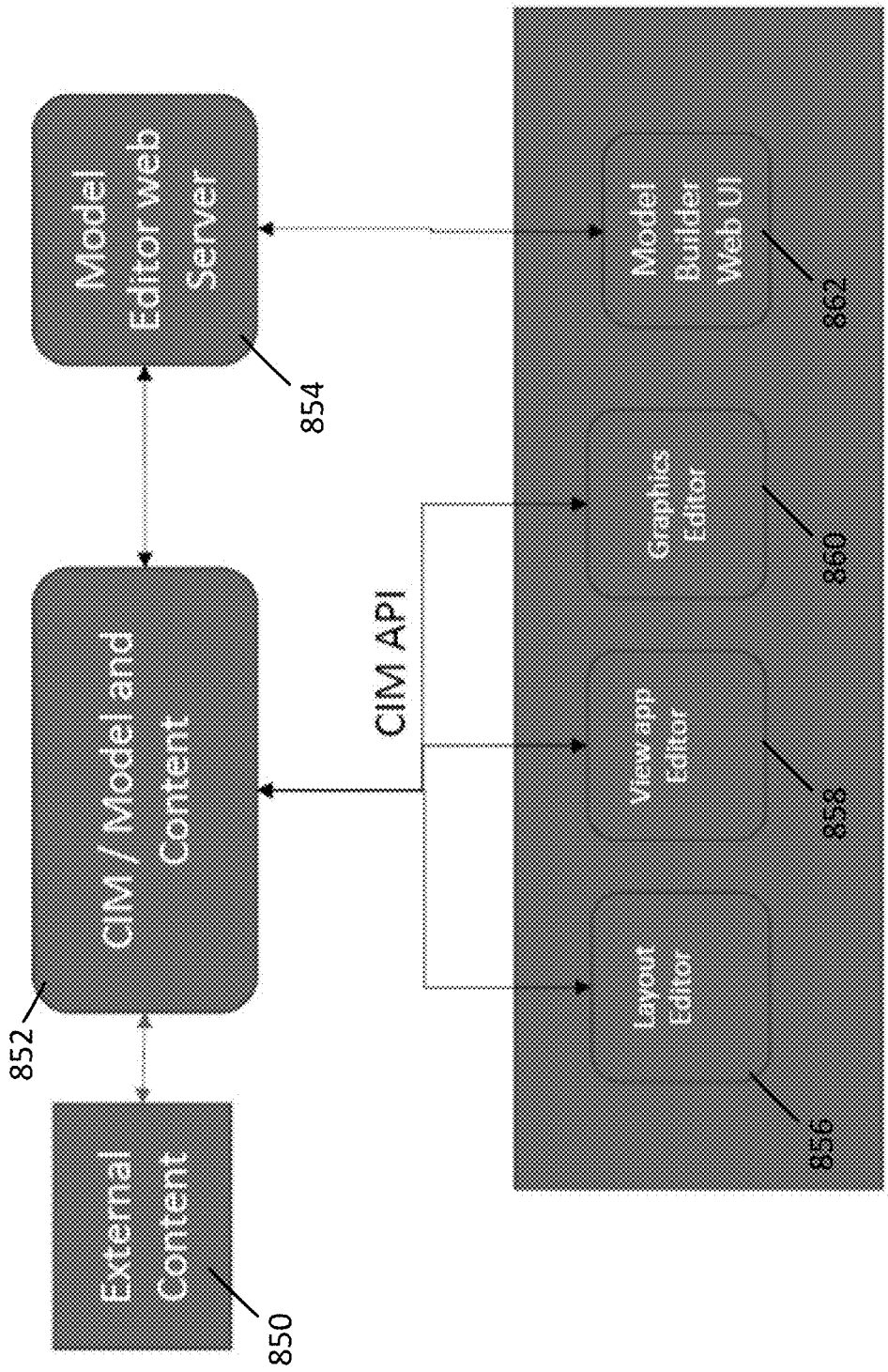

FIGS. 8A-8B illustrate a configuration architecture according to some embodiments. In some embodiments, as illustrated in FIG. 8A, the configuration architecture can comprise a CIM 802, a model editor web server 804 and a CIM API, which includes a layout editor 806, a view App editor 808, a graphics editor 810, and a model builder web UI 812. In some embodiments, as illustrated in FIG. 8B, the components (CIM 852, a model editor web server 854 and a CIM API, which includes a layout editor 856, a view App editor 858, a graphics editor 860, and a model builder web UI 862) can be configured to receive and/or send external content 850 (e.g., connected to a database that provides external content). In some embodiments, external content can relate to asset model.

In some embodiments, the configuration architecture of FIGS. 8A-8B can use the editors from on-premise. In some embodiments, a user can use existing editors for graphics, layouts, and the view App. In some embodiments, a user can re-host in a new lightweight downloadable application tool. In some embodiments, a user can deploy to cloud software. Additionally, some embodiments include import/export to and from WSP/OMI.

Figure 9A:
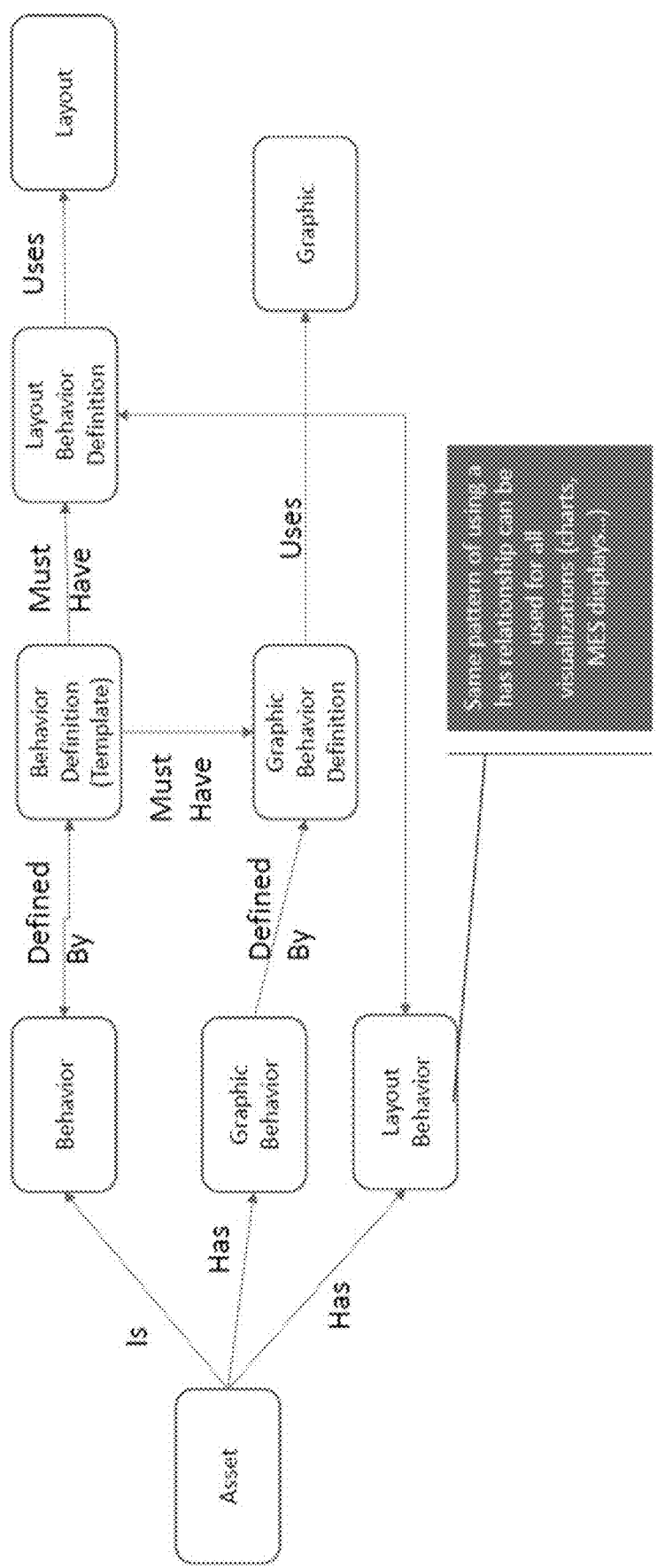
FIGS. 9A-9B illustrate a model for layouts and graphics according to some embodiments of the present disclosure.
Figure 9B:
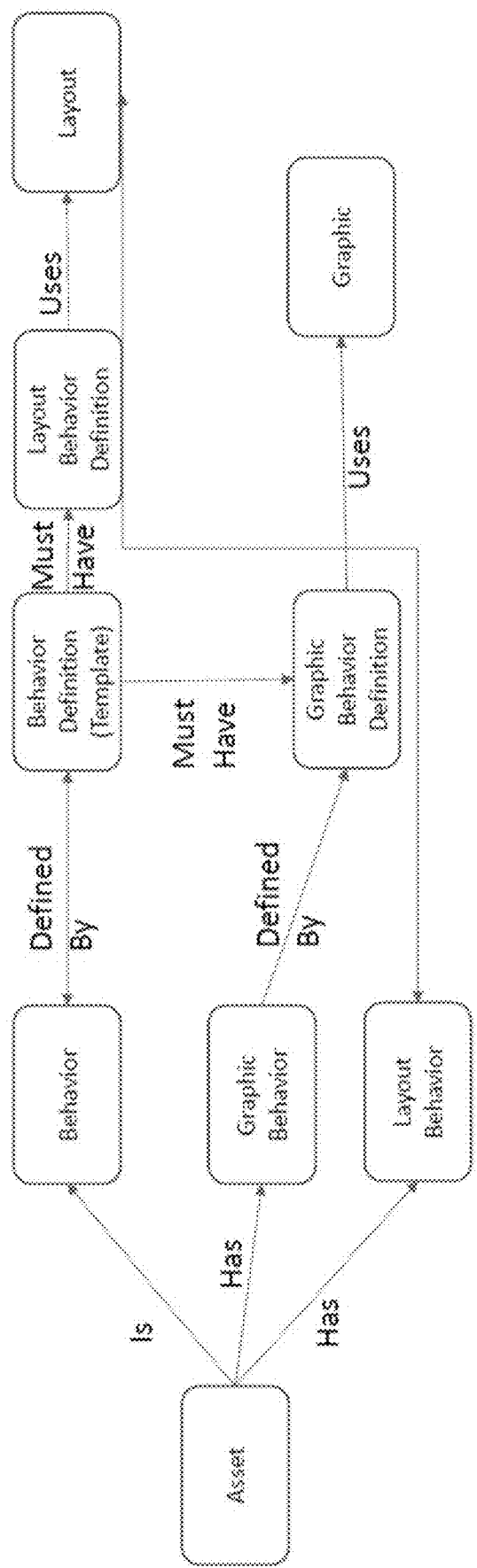

FIGS. 9A-9B illustrate a model (900, 950, respectively) for layouts and graphics according to some embodiments. In some embodiments, an asset can be behavior. In some embodiments, an asset can have graphic behavior and layout behavior. In some embodiments, behavior can be defined by behavior definition template. In some embodiments, the behavior definition template can have a layout behavior definition. In some embodiments, a layout behavior definition can use a layout. In some embodiments, the behavior definition template can have a graphic behavior definition.

In some embodiments, the graphic behavior can be defined by the graphic behavior definition. In some embodiments, the graphic behavior definition can use graphics. In some embodiments layout behavior can use a layout behavior definition. In some embodiments, the same pattern of using a has relationship can be used for all visualizations (charts, MES displays and the like.)

Some embodiments include steps to create an asset from a template. In some embodiments, the steps to create an asset from a template include: create asset, read behavior definition specified, create behavior from the behavior definition, relate behavior created to the asset using a has relationship, create behaviors related to the behavior definition with a must have relationship, and relate all created behavior to the new asset with an Is relationship. Some embodiments can comprise an inheritance of simple or other desired assets.

Figure 10:
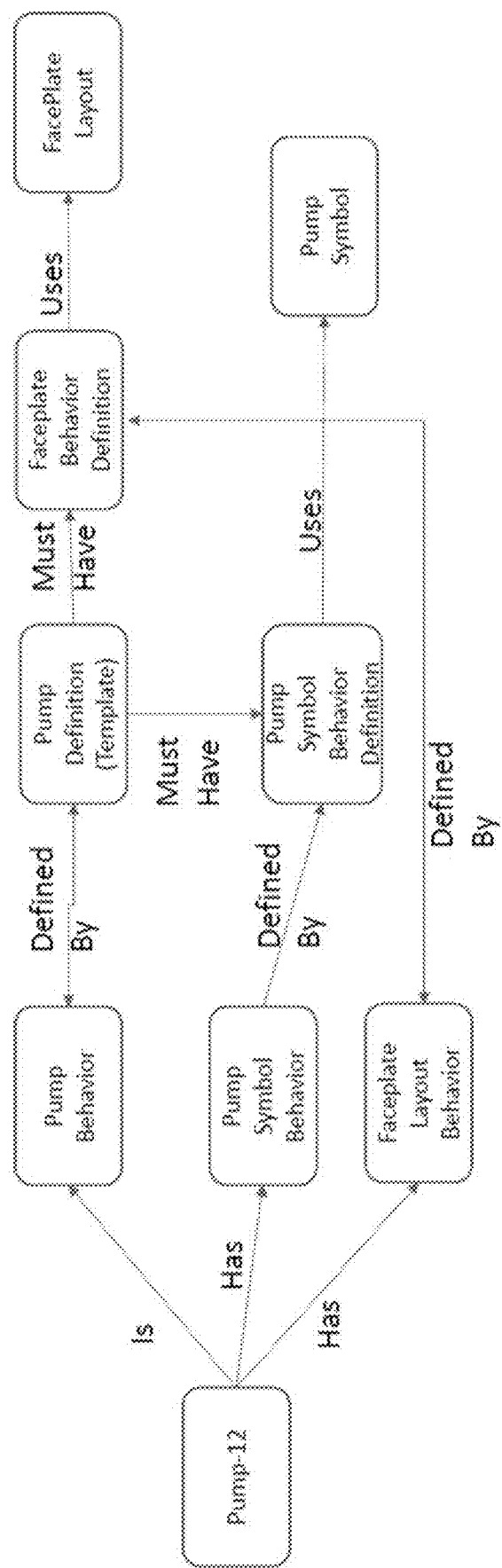
FIG. 10 illustrates creating an asset from a template in CIM according to some embodiments of the present disclosure.

FIG. 10 illustrates an example model 1000 for creating an asset from a template in CIM according to some embodiments. Some embodiments, by way of a non-limiting example, include, pump-12, pump behavior, pump definition template, faceplate behaviors definition, faceplate layout, pump symbol behavior, pump symbol behavior definition, pump symbol, and faceplate layout behavior.

In some embodiments, pump-12 can comprise information indicating a pump behavior. In some embodiments, pump behavior can be defined by the pump definition template. In some embodiments the pump definition template can have a faceplate or other component behavior definition. In some embodiments, a faceplate behavior definition can use a faceplate layout.

In some embodiment, pump-12 can have a pump symbol behavior. In some embodiments, the pump symbol behavior can be defined by a pump symbol behavior definition. In some embodiments, the pump symbol behavior definition can use a pump symbol. In some embodiments, pump-12 can have a faceplate layout behavior. In some embodiments, the faceplate layout behavior can be defined by the faceplate behavior definition. In some embodiments, the pump definition template can have a pump symbol behavior definition.

Some embodiments include common Apps. In some embodiments, Apps can be an important capability of cloud software. In some embodiments, current OMI Apps can be based on WPF. In some embodiments, Intouch web client can have equivalent web Apps for trending and alarms. In some embodiments, Intouch web client web apps can be managed during conversion. In some embodiments, LCNC framework can require common Apps that can run in all environments. In some embodiments, the environments can be based on a widget framework (web controls). In some embodiments, environments can comprise common SDK supporting OMI on-premise and Insight application models. In some embodiments, the environments can have existing OMI APIs including context, property access, layout and symbol. Some embodiments include new APIs. In some embodiments, new APIs can comprise secure storage and forms.

Figure 11:
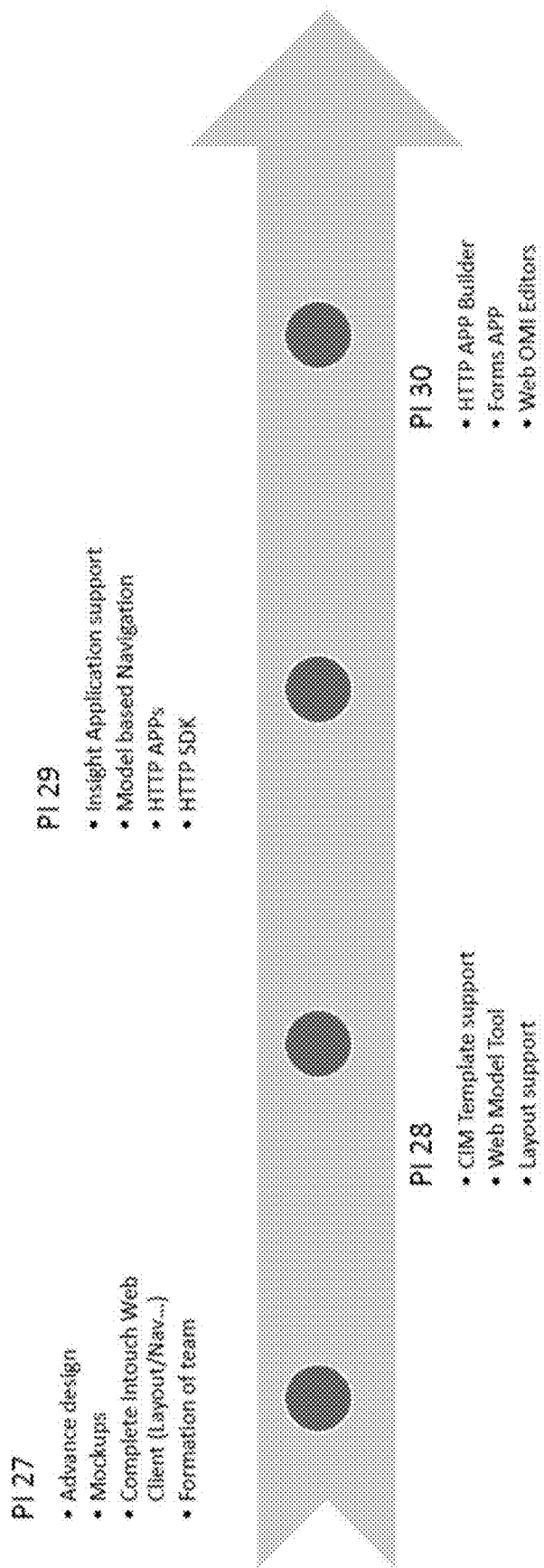
FIG. 11 illustrations a story board according to some embodiments of the present disclosure.

FIG. 11 illustrates a non-limiting example of a story board 1100 according to some embodiments. Some embodiments include PI 27, PI 28, PI 29, and PI 30. In some embodiments, PI 27 can comprise advance design, mockups, complete Intouch web client (layout/navigation), and formation of a team. In some embodiments, PI 28 can comprise CIM template support, web model tool, layout support, and re-use existing OMI editors. In some embodiments PI 29 can comprise cloud (e.g., Insight®) application support, model based navigation, HTTP Apps and HTTP SDK. In some embodiments, PI 30 can comprise HTTP App builder, forms App, and web OMI editors.

Some embodiments can comprise set owning object animation. Some embodiments include link properties visually between visual objects and IO/assets.

In some embodiments, existing editors (graphics/layout/viewapp) can be de-coupled from GR and hooked up to CIM/InSight® with Cloud based asset/template tools. In some embodiments, a user can build viewapps. In some embodiments, the viewapps can be deployed to the cloud. Some embodiments comprise InTouch® web client that can run OMI in the cloud.

Some embodiments comprise an application concept in InSight®. Some embodiments comprise downloadable tools to build, publish graphics, layouts, and viewapp. Some embodiments include web based tools to build a model. In some embodiments, CIM can support asset templates.

In some embodiments, multi-mode fiber, technology, internet or other technology (MMF) features can create asset templates in Insight. Additionally, some embodiments include create assets based on templates, associate graphics and layouts to assets, create graphics and publish to Insight, and create an application in Insight. In some embodiments, an application in Insight can create layouts support, create an autofill model based navigation in layouts, create HTML (custom widgets) based APPs for OMI and Insight, and add OMI APIs to MA (selected assets etc.) Some embodiments comprise HTML Apps in a layout.

Some embodiments comprise Realtime alarms in Insight®. Additionally, some embodiments comprise advanced content types, (i.e. all pumps, all with OEE, and the like).

Figure 12:
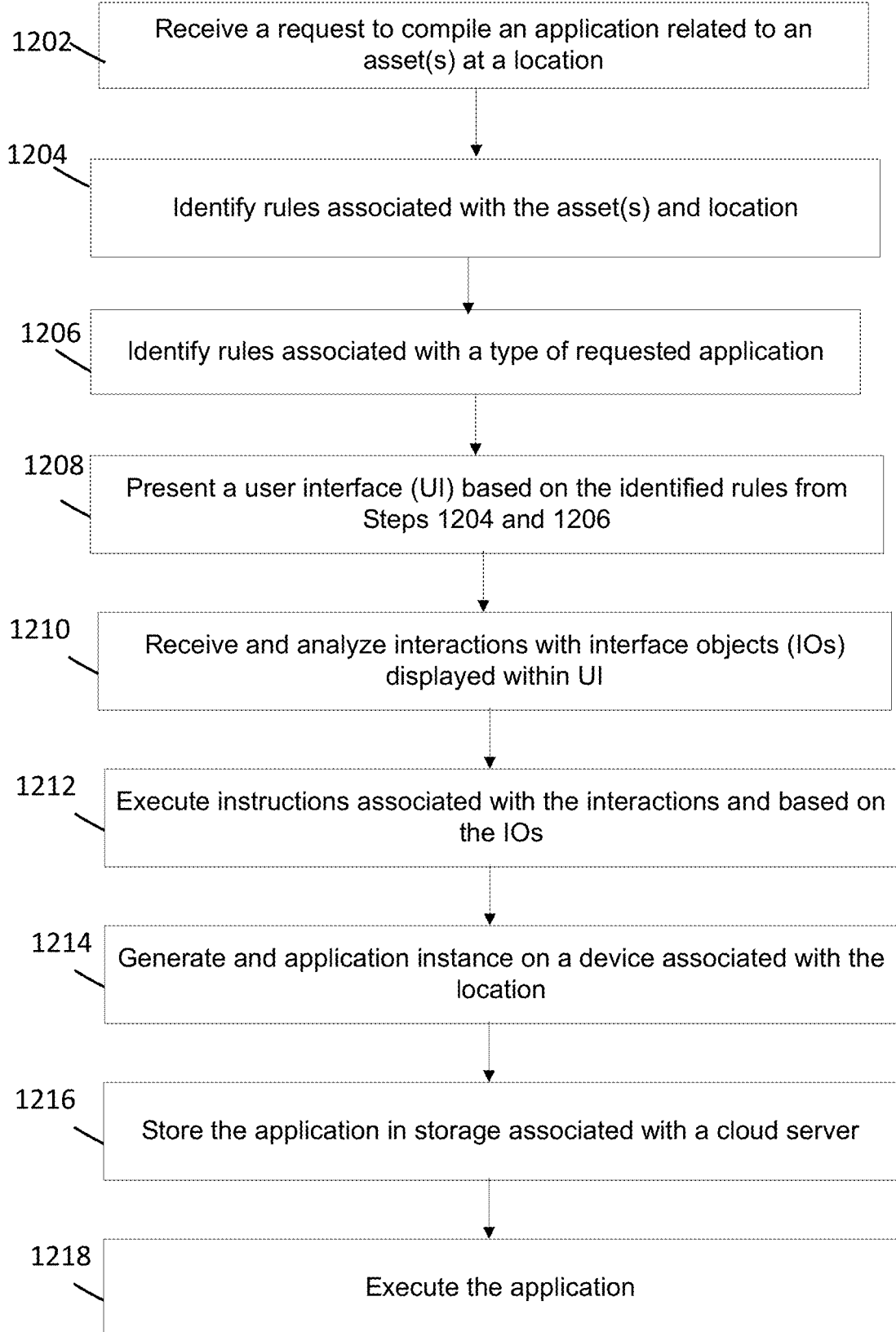
FIG. 12 details a non-limiting data flow according to some embodiments of the present disclosure.

Turning now to FIG. 12, Process 1200 details some embodiments of the LCNC framework that enables the creation of software (e.g., applications) through graphical user interfaces and configurations instead of traditional hand-coded programming. The LCNC engine 400 enables developers of varied experience levels to create applications using a visual user interface in combination with model-driven logic (as provided by the UI/IOs discussed below).

According to some embodiments of Process 1200, Step 1202 is performed by request module 402 of LCNC engine 400; Steps 1204-1206 are performed by rules module 404; Steps 1208-1210 are performed by UI module 406; and steps 1212-1218 are performed by execution module 408.

Process 1200 begins with Steps 1202 where, in some embodiments, a request is received. The request is in connection with the generation of an application on a device executing or operating at a location. The application is directed to analyzing, running, performing maintenance or otherwise viewing data about and/or controlling at least one asset at the location. For example, as discussed above, the requested application can be a specific configuration of an SDK or API where types of computations, for example, determining alarms, for an asset are identified, reported and/or automatically remedied via the application.

In some embodiments, the request can identify whether a LC or NC environment is being requested, as discussed in more detail below. In some embodiments, the request can further identify which platform the application will be executed on, and other types of configurations that can dictate the application's structure, configuration and operating environment.

In Step 1204, in some embodiments, rules associated with the asset and location (identified from Step 1202) are identified. The rules correspond to a structure, code type (e.g., Java, for example), code format (LC or NC), type of asset, type of location, type of request, features of the asset and/or type of request, and the like. Thus, reference to rules with reference to Step 1204 correspond to attributes, features, structure or characteristics of the application and how it corresponds to an asset or location. For example, a rule can indicate that certain types of apps are only available for analyzing and reporting data about an asset, and that such application must be configured, secured and/or structured a certain way to ensure privacy of the information while maintaining the ease in creating and displaying the information.

In some embodiments, the rules, which can be static or dynamic, can be based on, but not limited to, particular calculations, particular algorithms, types of actions allowed, permitted and/or denied, how the data will be stored, retrieved and the like, or some combination thereof.

In some embodiments, the rules of Step 1204 can identify whether a LC or NC environment is being requested, as discussed in more detail below. That is, an particular type of application for a particular asset and/or location can require a particular type of off-site generation: either LC or NC, as discussed herein.

In Step 1206, in some embodiments, rules associated with a type of application are identified. Such rules can be identified as part of Step 1204 as discussed above. In some embodiments, rules for an asset are identified (In Step 1204), then based on the asset and a request, a particular type of application is identified, and such rules are then identified (Step 1204). The identified rules in Step 1204 can be structured, identified and/or stored in a similar manner as discussed above.

In some embodiments, the retrieval, generation or identification of the rules in Steps 1204-1206 can be performed in reverse order, or as a single step.

In some embodiments, the identified rules from Steps 1204-1206 can be predefined by and stored at the server and/or at the domain level, as discussed above in creating the LCNC framework and computing environment. That is, as discussed above in relation to FIGS. 5-11, components for creation of an application are determined, then at remote locations, applications can be compiled and executed in an effort to offload resources and ensure particular types of applications are executed for particular assets, as requested from each location.

In Step 1208, in some embodiments, a user interface (UI) is compiled, generated or otherwise created and sent to the user for display. The UI comprises interface objects (IOs) that corresponds to editing tools, layout tools, formatting tools, functionality tools, scripting tools, and other types of functionality that are specific to the rules identified in Steps 1204-1206. Such IOs and functionality are discussed above in relation to FIGS. 5-11. The IOs enable users to interact with (e.g., drag and drop, among other types of interactions and editing input) presented information that enables the generation and execution of specific types of requested applications, that are particular to certain operating environments of assets and/or locations.

In Step 1210, in some embodiments, inputs, modifications, manipulations or other types of feedback responsive to the presented UI (and its IOs) are received and analyzed. The analyzing enables the types of restructuring and/or types of modifications to be performed according to a LC and/or NC environment. By way of a non-limiting example, the feedback can include, but is not limited to, actions including modification of a layout, editing of a tool, editing of a size, editing of a format, editing of a function, addition of a function and removal of a function, and the like, or some combination thereof.

According to some embodiments, the analysis and determination of the modifications to be performed in response to the UI/IO input can involve any type of known or to be known computational analysis technique, including but not limited to, vector analysis, data mining, computer vision, machine learning, neural network, artificial intelligence, and the like, or some combination.

In Step 1212, in some embodiments, computer-executable instructions associated with the analyzed input from Step 1210 are automatically executed. Such execution, as discussed above, enables the compilation of the specific type of application for the asset(s) and/or location.

In Step 1214, in some embodiments, the application instance and/or version is generated. Such generation is performed according to the specified structure, configuration and capabilities determined from Steps 1210-1212. Thus, for example, the application is capable of analyzing an asset for particular types of data (e.g., alarm data) and outputting certain types of data in response (e.g., certain types of alarms). This light-weight application formation capability enables particular version of applications to be created for specific purposes, which streamlines how assets and/or locations can be managed and controlled from a central point at the location (or from another location).

In Step 1216, in some embodiments, the generated application version is stored. Such storage can be locally, in the cloud, at the server, or some combination thereof. Such storage enable the application to be installed at other locations, and/or retrieved and modified according to Steps 1208-1214 for different assets or the same type of asset at another location.

In Step 1218, in some embodiments, the generated application is executed. Such execution is performed according to how the application was configured, which involves the functions and executed algorithms that were modified, identified and/or included from interaction with the IOs, as discussed above.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "developer", "citizen developer", "citizen engineer", "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternative embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A computing device comprising:
one or more processors;
a non-transitory computer-readable memory having stored therein computer-executable instructions, that when executed by the one or more processors, cause the one or more processors to perform actions comprising:
receiving a request receiving a request to generate an application, the request comprising information indicating specific functionality of a physical asset at a location, the specific functionality including at least an indication of at least one of a low code environment and a no-code environment of the physical asset;
identifying application rules associated with the physical asset and application rules associated with the specific functionality;
configuring a user interface (UI) based on the identified application rules and the specific functionality of the physical asset, the UI comprising interface objects (IOs) corresponding to capabilities for generating components of the requested application;
receiving interactions with the IOs, the interactions comprising feedback indicating a configuration of the capabilities;
generating, based on the received interactions, the requested application, the generated application being configured according to the configured capabilities identified from the interactions; and
enabling, via the computing device, execution of the generated application.

2. The computing device of claim 1, further comprising: storing information related to the generated application in cloud storage.

3. The computing device of claim 2, further comprising: receiving another request related to another physical asset, the other physical asset being a type of asset that is related to the physical asset at the location; retrieving the stored information for the generated application; and configuring another UI based on said information.

4. The computing device of claim 3, wherein said other physical asset is at another location, wherein said other UI is compiled further based on information related to the other location.

5. The computing device of claim 1, wherein said feedback comprises an action selected from a group consisting of: modification of a layout, editing of a tool, editing of a size, editing of a format, editing of a function, addition of a function and removal of a function.

6. The computing device of claim 1, wherein said specific functionality for the requested application corresponds to at least one of a type of operation performed by the physical asset, a type of input/output data and type of computations performed by the physical asset.

7. The computing device of claim 1, wherein said applications rules for the physical asset and specific functionality are retrieved from a cloud storage on a network.

8. The computing device of claim 1, wherein said physical asset application rules correspond to capabilities of the physical asset and a type of data associated with operation of said physical asset.

9. The computing device of claim 1, wherein said application rules for the specific functionality correspond to operations of the physical asset and capabilities for performing the operations.

10. The computing device of claim 1, wherein said request is received from a device executing at the location.

11. The computing device of claim 1, further including transmitting the UI to a user.

12. A method comprising:
receiving, by a computing device, a request to generate an application, the request comprising information indicating specific functionality of a physical asset at a location, the specific functionality including at least an indication of at least one of a low code environment and a no-code environment of the physical asset;
identifying, by the computing device, application rules associated with the physical asset and application rules associated with the specific functionality;
configuring, by the computing device, a user interface (UI) based on the identified application rules and the specific functionality of the physical asset, the UI comprising interface objects (IOs) corresponding to capabilities for generating components of the requested application;
receiving, by the computing device, interactions with the IOs, the interactions comprising feedback indicating a configuration of the capabilities;
generating, by the computing device, based on the received interactions, the requested application, the generated application being configured according to the configured capabilities identified from the interactions; and
enabling, by the computing device, execution of the generated application.

13. The method of claim 12, further comprising: storing information related to the generated application in cloud storage.

14. The method of claim 13, further comprising: receiving another request related to another physical asset, the other physical asset being a type of asset that is related to the physical asset at the location; retrieving the stored information for the generated application; and configuring another UI based on said information.

15. The method of claim 14, wherein said other physical asset is at another location, wherein said other UI is compiled further based on information related to the other location.

16. The method of claim 12, wherein said feedback comprises an action selected from a group consisting of: modification of a layout, editing of a tool, editing of a size, editing of a format, editing of a function, addition of a function and removal of a function.

17. The method of claim 12, wherein said applications rules for the physical asset and specific functionality are retrieved from a cloud storage on a network, wherein said physical asset application rules correspond to capabilities of the physical asset and a type of data associated with operation of said physical asset, wherein said application rules for the specific functionality correspond to operations of the physical asset and capabilities for performing the operations.

18. A non-transitory computer-readable storage medium tangibly encoded with computer-executable instructions, that when executed by a processor associated with a computing device, performs a method comprising:
receiving, by the computing device, a request to generate an application, the request comprising information indicating specific functionality of a physical asset at a location, the specific functionality including at least an indication of at least one of a low code environment and a no-code environment of the physical asset;
identifying, by the computing device, application rules associated with the physical asset and application rules associated with the specific functionality;
configuring, by the computing device, a user interface (UI) based on the identified application rules and the specific functionality of the physical asset, the UI comprising interface objects (IOs) corresponding to capabilities for generating components of the requested application;
receiving, by the computing device, interactions with the IOs, the interactions comprising feedback indicating a configuration of the capabilities;
generating, by the computing device, based on the received interactions, the requested application, the generated application being configured according to the configured capabilities identified from the interactions; and
enabling, by the computing device, execution of the generated application.

19. The non-transitory computer-readable storage medium of claim 18, further comprising: storing information related to the generated application in cloud storage; receiving another request related to another physical asset, the other physical asset being a type of asset that is related to the physical asset at the location; retrieving the stored information for the generated application; and compiling and presenting another UI based on said information.

* * * * *